United States Patent [19]
Healy et al.

[11] Patent Number: 5,968,238
[45] Date of Patent: Oct. 19, 1999

[54] POLISHING COMPOSITION INCLUDING WATER SOLUBLE POLISHING AGENT

[75] Inventors: Denis J. Healy, Winnetka; Harvey Kornhaber, Palos Park; Maharaj Talwar, Tinley Park, all of Ill.

[73] Assignee: Turtle Wax, Inc., Chicago, Ill.

[21] Appl. No.: 09/025,535

[22] Filed: Feb. 18, 1998

[51] Int. Cl.$^6$ ........................................... C09G 1/02
[52] U.S. Cl. ........................ 106/3; 106/11; 106/287.1; 106/287.11
[58] Field of Search ................... 106/3, 11, 287.1, 106/287.11

[56] References Cited

U.S. PATENT DOCUMENTS

| | | | |
|---|---|---|---|
| 3,071,479 | 1/1963 | Fulenwider, Jr. | 106/11 |
| 3,544,498 | 12/1970 | Holdstock et al. | 106/3 |
| 3,577,347 | 5/1971 | Monick | 252/99 |
| 3,869,323 | 3/1975 | Basi | 156/17 |
| 3,869,324 | 3/1975 | Basi et al. | 156/17 |
| 3,960,575 | 6/1976 | Martin | 106/11 |
| 4,013,475 | 3/1977 | Liebowitz et al. | 106/10 |
| 4,113,677 | 9/1978 | Svedas et al. | 260/23 R |
| 4,203,857 | 5/1980 | Dugan | 252/92 |
| 4,289,640 | 9/1981 | Falivene | 252/95 |
| 4,347,333 | 8/1982 | Lohr et al. | 106/3 |
| 4,398,953 | 8/1983 | Van Der Linde | 106/11 |
| 4,462,828 | 7/1984 | Otsuki | 106/3 |
| 4,665,116 | 5/1987 | Kornhaber et al. | 524/268 |
| 4,797,231 | 1/1989 | Schumann et al. | 252/547 |
| 4,830,783 | 5/1989 | Ellis et al. | 252/545 |
| 4,880,557 | 11/1989 | Ohara et al. | 106/3 |
| 4,919,847 | 4/1990 | Barletta et al. | 252/558 |
| 5,064,688 | 11/1991 | Trifon | 427/140 |
| 5,154,759 | 10/1992 | Cifuentes et al. | 106/3 |
| 5,261,951 | 11/1993 | Sejpka et al. | 106/3 |
| 5,330,787 | 7/1994 | Berlin et al. | 427/154 |

FOREIGN PATENT DOCUMENTS

| | | | |
|---|---|---|---|
| 1318699 | 5/1973 | United Kingdom | 106/11 |

OTHER PUBLICATIONS

Table 85 on p. 541 of *Grent & Hackh's Chemical Dictionary*, 5th ed., Oct. 1987.

Primary Examiner—C. Melissa Koslow
Attorney, Agent, or Firm—Baker & McKenzie

[57] ABSTRACT

An improved polishing composition is provided that includes an emulsion of a oil-based components and water-based components and a water soluble polishing agent. The polishing composition of the present invention is rubbed on a painted surface, hosed off with water and wiped or towel dried. Because of the use of a water soluble polishing agent in the polishing composition, all or substantially all of the polishing agent is washed away with the water. This eliminates the need for a two-step polishing process wherein a polishing composition is applied to a surface and allowed to dry in a first step and the surface is buffed with a dry cloth in a second step. One preferred embodiment of the present invention includes silicones, water, a nonionic or anionic surfactant and a water soluble polishing agent. Optionally, the polishing composition may include a solvent, mineral oil, wax, and a preservative.

37 Claims, No Drawings

POLISHING COMPOSITION INCLUDING WATER SOLUBLE POLISHING AGENT

BACKGROUND OF THE INVENTION

1. Field of the Invention

This invention relates to a polishing composition and more particularly to a polishing composition comprising an aqueous emulsion containing at least one water soluble polishing agent. By rubbing the polishing composition on a painted surface and washing it off with water, a surface having a glossy protective layer results without any unsightly residue remaining on the surface.

2. Description of the Related Art

Polishing compositions are generally used to produce a glossy finish on a surface. The gloss provided by the polishing composition is the result of the mixture of components in the polishing composition. Certain components clean the surface; others smooth the surface; and other components leave a protective film coating. For instance, floor polish produces a glossy finish by depositing a film on the floor surface. Motor vehicle polishing compositions produce a glossy and protective film and may include additional additives such as polishing agents and/or abrasives which assist in the removal of weathered paint, soil and old built-up polish. Metal polishes may contain polishing agents for abrasive smoothing and cleaning of the surface being treated and additional components that function to remove and prevent tarnish.

Motor vehicle polishing compositions are specially formulated from a number of components so that the polishing composition can perform different functions when a painted vehicle surface is treated with the polishing composition. For example, a motor vehicle polishing composition may include hydrocarbon solvents in order to facilitate the removal of greasy dirt from the vehicle surface and to slow the evaporation of the water in the polishing composition. Waxes may also be included in a motor vehicle polishing composition so that the polishing composition may be buffed to a high shine that provides resistance to weathering.

Silicone materials are increasingly being incorporated into motor vehicle polishing compositions as the silicone materials can perform many functions. For instance, the silicone materials act as lubricants for easing the application of the polishing composition to the vehicle surface. Also, the silicone materials form a film on the vehicle surface that provides a water repellant, durable, uniform high gloss to the surface. These silicone based surface films have been noted as having increased resistance to removal by environmental elements such as rain, sleet and snow.

A motor vehicle polishing composition may also contain surfactants, stabilizers, thickeners, and preservatives for the production of a homogeneous stable product of desired consistency and shelf life. Surfactants and stabilizers are added to the polishing composition in order to form an emulsion of the oil-based components and the water-based components of the composition and to keep the components in emulsion form. Both oil-in-water and water-in-oil emulsions are used in polishing compositions. Thickeners are added to the polishing compositions in order to control the form of the composition as the polish may be supplied in solid, semisolid, presoftened or liquid form. The preservatives added to the polishing composition are generally commercially available anti-microbial agents.

Motor vehicle polishing compositions also include at least one polishing agent and/or abrasive. The polishing agents are typically particulate materials that perform numerous functions in the polishing composition. For example, the polishing agent acts as an abrasive cleaner that assists in removing weathered paint, stubborn road soil and old built-up polish. The polishing agent may also provide for mild abrasive smoothing of the painted surface. However, the polishing agent must be mild enough to avoid scratching and dulling of the painted surface. Typically, the polishing agent is suspended in the emulsion formed between the oil-based and water-based components of the polishing composition.

The polishing agents used in motor vehicle polishing compositions are not water soluble; therefore, the polishing compositions must be applied to a vehicle surface in a two-step process. First, the polishing composition is applied to the surface with a wet sponge or towel. After the polishing composition has dried on the vehicle surface, a residue remains on the polished surface. Consequently, a buffing step is required to remove the residue from the vehicle surface. While the residue is generally easy to remove from relatively flat surfaces, it is very difficult to remove the residue from cracks, crevices and other hard-to-reach places. In addition, the residue is quite noticeable and aesthetically unsightly.

In currently available polishing compositions, one of the components of the residue that remains on the vehicle surface is the polishing agent or a blend of the polishing agents, such as kaolin clay or diatomaceous earth, used individually or in combination. The residue tends to lodge in cracks, crevices and around the numerous indicia on vehicle surfaces because the residue (i.e. the clay or diatomaceous earth) is not water soluble, i.e., it cannot be washed off with water. The residue remains lodged in these areas after the buffing process is completed and even after subsequent washings. As a result, the residue is a very unpleasant sight for the consumer and must be removed manually which is a tedious chore.

As detailed above, polishing agents are generally insoluble solid particulate cleaning or polishing agents which are an important component of polishing compositions as the polishing agents provide physical surface preparation and cleaning. The ability of a polishing agent to clean and smooth out surface imperfections depends upon the chemical type, particle size, shape and hardness of the particulates comprising the polishing agent. As noted above, the most common types of polishing agents used in polishing compositions are diatomaceous earth and kaolin clays. Kaolin clays are anhydrous aluminum silicates and are extensively used in polishing compositions. One commercially available type of kaolin clay is sold under the trade name Kaopolite® 1152 and is manufactured by Kaopolite, Inc., Elizabeth, N.J. It has an average particle size of 0.8 microns. Another commercially available kaolin clay is sold in the trade as Polestar 400A and is manufactured by E.C.C. America Inc., Atlanta, Ga. Diatomaceous earth is the soft earth rock composed of the siliceous skeletons of small aquatic plants. Two examples of diatomaceous earth used in polishing compositions are Celatom MN-23, which is available from Eagle-Picher Industries, Inc., Cincinnati, Ohio, and Snow Floss, which is available from Johns-Manville.

Another type of polishing composition is an aqueously dispersed polishing composition used primarily by commercial car washes. These aqueously dispersed polishing compositions do not contain any of the polishing agents in current use (such as kaolin clays and diatomaceous earths) because these polishing agents are not soluble in water and therefore, cannot be dispersed from an overhead spray arch onto a vehicle without clogging the spray nozzles.

Therefore, a consumer generally has two choices in motor vehicle polishing compositions. First, the consumer may choose a conventional polishing composition that includes a polishing agent that is insoluble in water. With this choice, it will be necessary to apply the polishing composition in the laborious two-step process described above. Second, the consumer may choose an aqueously dispersed polishing compound that does not contain a polishing agent. Usually, this choice involves running the motor vehicle through a car wash. However, when a consumer chooses an aqueously dispersed polishing composition without a polishing agent, he or she may sacrifice the benefits that a polishing agent imparts to a polishing composition, such as vastly improved surface cleaning and smoothing. Therefore, it can be appreciated that conventional motor vehicle polishing compositions do not provide the consumer with an optimum combination of polishing effectiveness and ease of use.

Rinse away one step polishes that eliminate the two-step polishing process described above have been proposed. For example, U.S. Pat. No. 5,330,787 discloses a multi-component polish composition that may be applied to a vehicle surface and rinsed away after the composition has dried on the vehicle. It is stated that this one step polishing system leaves a protective coating on the painted surface after the dried composition is rinsed away. However, it is believed that the protective coating formed by this one step polish composition does not provide for optimum durability, especially after the protective coating has been subjected to multiple detergent washings.

In light of the current consumer demand that polishing compositions be easy to use, highly effective in producing a clean glossy surface and durable, there is a continuing need for an effective polishing composition that eliminates the two-step polishing process described above yet still provides for maximum durability after repeated detergent washings. The improved polishing composition could be applied to a surface and then simply washed off with water. Furthermore, there is a long-felt need and inevitably a strong consumer demand for a polishing composition that may be rubbed onto a surface and washed off with water without leaving any unsightly white or light colored residue. Such a polishing composition would be faster and easier to use and would eliminate the unpleasant sight of residue deposited on the surface or in cracks or crevices between surfaces. In addition, the protective coating remaining on the surface after the residue of the composition has been rinsed off the surface would exhibit improved durability even after numerous detergent washings.

It is therefore an object of the present invention to provide a unique polishing composition comprising an emulsion of water-based components and oil-based components that includes at least one water soluble polishing agent.

Yet another object of the present invention is to provide a unique polishing agent for a polishing composition, the polishing agent being selected such that the polishing composition does not require buffing after the polishing composition has been applied to the surface being treated.

Still another object of the present invention is to provide a unique polishing composition including a water soluble polishing agent, the polishing composition capable of being removed with water without leaving a residue.

It is a further object of the present invention to provide an improved car polish that does not require a subsequent buffing process and produces a durable protective coating on the vehicle which can stand up to numerous detergent washings.

And another object of the present invention is to provide an improved car polish that does not require a subsequent buffing process and whereby the car polish is applied manually and hosed off without leaving any unsightly residue.

SUMMARY OF THE INVENTION

The present invention is an advance in the field of one-step polishing compositions that satisfies the foregoing needs by providing a polishing composition that includes a water soluble polishing agent. The polishing composition of the present invention is rubbed on a painted surface, hosed off with water and wiped or towel dried. All or substantially all of the polishing agent is washed away with the water because the polishing agent is water soluble. This is a significant departure from prior art polishing compositions containing polishing agents where the polishing composition must be used in a two step process, i.e., a first step wherein the composition is applied to the surface and allowed to dry, and a second step wherein the surface is buffed with a dry cloth.

The polishing composition of the present invention comprises an emulsion of at least one oil-based component and at least one water-based component, and a water soluble polishing agent. Preferably, the water soluble polishing agent is a carbonate. The most preferred water soluble polishing agent is sodium bicarbonate. Optionally, the polishing composition includes at least one hydrocarbon solvent.

The water soluble polishing agent may be added to the polishing composition in an amount that exceeds the solubility of the polishing agent in water at room temperature so that some of the polishing agent dissolves in the water-based component of the polish and some of the polishing agent is suspended in the polishing composition. The polishing agent in suspension is immediately available for use as a polishing agent once the polishing composition is applied to the surface to be polished. Further, as the polishing composition is spread out across the vehicle surface, the water evaporates and the dissolved polishing agent precipitates out onto the vehicle surface so that it can also serve as a polishing agent.

Alternatively, the polishing agent can be added to the polishing composition in an amount wherein all of the polishing agent dissolves in the water component of the polishing composition. In this version of the polishing composition, the polishing agent will act as a polishing agent once the composition is rubbed out onto the surface and the water begins to evaporate, i.e., the polishing agent will precipitate out as the water evaporates so that it can act as a polishing agent.

These and other features, aspects, objects, and advantages of the present invention will be become better understood upon consideration of the following detailed description and appended claims.

DESCRIPTION OF THE PREFERRED EMBODIMENTS

The polishing compositions of the present invention may be applied to the body surface of a vehicle or other similarly hard metal surface substrate. While an automobile surface will be utilized as an exemplary substrate in the following description and examples, it should be understood that the present invention is not limited to the polishing of vehicle surfaces.

A polishing composition according to the present invention comprises as functional ingredients: a gloss agent, a water soluble polishing agent, a nonionic or anionic surfactant, and water. Optionally, the polishing composition may contain a solvent, mineral oil, wax, and a preservative.

Silicone materials are preferably employed as the gloss agent of the polishing composition of the present invention. After the polishing composition has been applied to a vehicle surface and rinsed off, the silicone materials remain as a film on the vehicle surface providing a water repellant, durable, uniform high gloss to the surface. In addition, the silicone materials also act as lubricants for easing the application of the polishing composition to the vehicle surface. Silicone materials which have proven to be suitable for incorporation into the polishing composition of the present invention include amino functional silicones, silicone oils, curable silicone resins, and mixtures of these silicone materials. Most preferably, the gloss agent is a mixture including at least one amino functional silicone, at least one silicone oil and at least one curable silicone resin.

The nonionic or anionic surfactant of the polishing composition of the present invention is added to the composition in order to emulsify the silicone materials, mineral oil and solvents. Numerous nonionic or anionic surfactants are suitable for forming an emulsion of the components of the polishing composition. Exemplary surfactants include: morpholine oleate soap, oleic acid triethanolamine soap, oleic acid/morpholine mixtures, oleic acid/triethanolamine mixtures, stearic acid/morpholine mixtures, stearic acid/triethanolamine mixtures, sodium oleate, sodium alkyl benzene sulfonate, polyoxyethylene alkylphenol ether, polyoxyethylene alkyl ether, polyoxyethylene fatty acid esters, ethylene oxide adducts of nonyl phenol, sorbitan monooleate, and mixtures of these surfactants. Depending on the formulation of components, the polishing compositions of the present invention may be oil-in-water emulsions, wherein water is the continuous phase and oil is the disperse phase (so called "water out emulsions"), or water-in-oil emulsions, wherein oil is the continuous phase and water is the disperse phase (so called "oil out emulsions"). It can be appreciated that the polishing compositions of the present invention that do not include a hydrocarbon solvent are solvent-free emulsions.

The water soluble polishing agent of the polishing composition of the present invention includes at least one inorganic material which exhibits solubility in water and which acts as an abrasive cleaner that assists in removing weathered paint, stubborn road soil and old built-up polish. As noted above, the water soluble polishing agent will be present in the polishing composition at one of two alternative concentration levels. In the first alternative concentration level, the water soluble polishing agent is added to the polishing composition in an amount that exceeds the solubility of the polishing agent in water so that some of the polishing agent dissolves in the water component of the polishing composition and some of the polishing agent is suspended in the polishing composition. In the second alternative concentration level, the polishing agent is added to the polishing composition in an amount wherein all of the polishing agent dissolves in the water component of the polishing composition.

When formulating a polishing composition according to the present invention, one can refer to a table of solubility parameters in order to determine the approximate level at which the water soluble polishing agent will begin to become suspended in the polishing composition. Depending on whether or not it is desirable to include some of the water soluble polishing agent in suspension in the polishing composition, the amount of water soluble polishing agent added to the water in the polishing composition formulation is adjusted accordingly. Table 1 lists water soluble polishing agents which are suitable for use in the polishing composition, along with the solubility of each polishing agent in cold and hot water. Accordingly, the water soluble polishing agent is an inorganic material selected from the group consisting of ammonium benzoate, ammonium bicarbonate, ammonium bromide, ammonium phosphate, potassium carbonate, potassium citrate, potassium phosphate, potassium sulfate, sodium bicarbonate, sodium carbonate, sodium citrate, sodium phosphate, sodium sulfate, and mixtures thereof.

TABLE 1

| NAME | FORMULA | Solubility in Grams/100 cc $H_2O$ | | | |
|---|---|---|---|---|---|
| | | Cold Water | | Hot Water | |
| Ammonium Benzoate | $NH_4C_7H_5O_2$ | 19.6 | 14.5° C. | 83.3 | 100° C. |
| Ammonium Bicarbonate | $NH_4HCO_3$ | 11.9 | 0° C. | 27.0 | 30° C. |
| Ammonium Bromide | $NH_4Br$ | 68.0 | 10° C. | 145.6 | 100° C. |
| Ammonium Phosphate, Monobasic | $NH_4H_2PO_4$ | 22.7 | 0° C. | 173.2 | 100° C. |
| Potassium Carbonate | $K_2CO_3$ | 105.5 | 0° C. | 156.0 | 100° C. |
| Potassium Citrate | $K_3C_6H_5O_7.H_2O$ | 167.0 | 15° C. | 200.0 | 31° C. |
| Potassium Phosphate (Monobasic) | $KH_2PO_4$ | 14.8 | 0° C. | 83.5 | 90° C. |
| Potassium Sulfate (Arcanite) | $K_2SO_4$ | 7.35 | 0° C. | 24.1 | 100° C. |
| Sodium Bicarbonate | $NaHCO_3$ | 6.90 | 0° C. | 16.4 | 60° C. |
| Sodium Carbonate (Soda Ash) | $Na_2CO_3$ | 7.10 | 0° C. | 48.5 | 104° C. |
| Sodium Carbonate (Sal Soda) | $Na_2CO_3.10H_2O$ | 21.5 | 0° C. | 238.0 | 30° C. |
| Sodium Citrate | $Na_3C_6H_5O_7.2H_2O$ | 77.0 | 25° C. | 170.0 | 100° C. |
| Sodium Phosphate (Monobasic) | $NaH_2PO_4.H_2O$ | 71.0 | 0° C. | 390.0 | 83° C. |
| Sodium Phosphate (Tribasic) | $Na_3PO_4$ | 4.50 | 0° C. | 77.0 | 100° C. |
| Sodium Sulfate (Thenardite) | $Na_2SO_4$ | 5.00 | 0° C. | 42.0 | 100° C. |

The solvents optionally incorporated into the polishing composition of the present invention facilitate the removal of greasy dirt from the vehicle surface and slow the evaporation of the water in the polishing composition. Preferably the solvent is a hydrocarbon solvent. Suitable hydrocarbon solvents include mineral spirits, liquid hydrocarbons derived from petroleum, naphtha, kerosene, and mixtures of these hydrocarbon solvents.

For optimum performance, i.e., ease of use, gloss and providing a protective coating to the painted surface, the concentration of the components of the polishing composition can be varied. One version of a polishing composition with a water soluble polishing agent is formed by combining from about 0.20 to about 5.5 weight percent nonionic or anionic surfactant, from about 0.1 to about 2.0 weight percent amino functional silicone, from about 0.5 to about 6.0 weight percent of silicone oils, from about 0.01 to about 3.5 weight percent of a curable silicone resin, from about 0.1 to about 5.0 weight percent of a mineral oil, from 0.0 to about 15.0 weight percent of a blend of hydrocarbon solvents, from about 0.05 to about 1.0 weight percent of a preservative, from about 5.0 to about 15.0 weight percent of a water soluble polishing agent, and from about 60 to about 90 weight percent deionized water. A summary of the above formula is presented below in Table 2:

TABLE 2

| Components | Weight Percent (as Actives) |
| --- | --- |
| Hydrocarbon Solvents | 0.0 to 15.0 |
| Silicone Oils | 0.5 to 6.0 |
| Mineral Oil | 0.1 to 5.0 |
| Amino Functional Silicone | 0.1 to 2.0 |
| Silicone Resin | 0.01 to 3.5 |
| Nonionic or Anionic Surfactant | 0.20 to 5.5 |
| Water | 60.0 to 90.0 |
| Water Soluble Polishing Agent | 5.0 to 15.0 |
| Preservative | 0.05 to 1.0 |

This invention is further illustrated in the following Examples and comparative tests, which are intended as exemplifying the invention and are not intended to be taken as limiting.

EXAMPLE A

A polishing composition in accordance with the present invention was prepared using the following components. It can be seen that sodium bicarbonate was chosen as the water soluble polishing agent in Example A.

| Components | Weight % |
| --- | --- |
| Part A | |
| 1. Mineral Spirits (Flash Point 107° F. TCC) CAS #64475-85-0 | 3.00 |
| 2. Mineral Spirits (Flash Point 162° F. TCC) CAS #92045-37-9 | 5.45 |
| 3. Dimethyl Silicone, 350 centistoke | 0.50 |
| 4. Dimethyl Silicone, 1,000 centistoke | 0.50 |
| 5. Dimethyl Silicone, 10,000 centistoke | 0.50 |
| 6. Dimethyl Silicone, 60,000 centistoke | 0.20 |
| 7. Mineral Seal Oil (Kermac 600, Kerr-McGee Refining Corp.) | 0.50 |
| 8. Amino Functional Silicone (GE SF-1706) | 0.50 |
| 9. Dimethicone/Trimethyl Siloxysilicate (Dow Corning 593) | 0.25 |
| 10. Curable Silicone Resin (GE SR-107) | 0.10 |
| 11. Sorbitan mono-oleate (Span 80, ICI Corp.) | 0.50 |
| Part B | |
| 12. Deionized Water | 82.90 |
| 13. Sodium Bicarbonate | 5.00 |
| Part C | |
| 14. Ethylene Glycol MonoButyl Ether (butyl "Cellosolve") | 0.08 |
| 15. 1,2-dibromo-2,4-dicyanobutane (Tektamer 38, Merck) | 0.02 |
| | 100.00 |

The polishing composition of Example A is prepared as follows. First, Part A is prepared by placing the two mineral spirits at room temperature (60°–70° F.) in a stainless steel container equipped with an adjustable mixer. Under slow agitation, the remaining components 3 to 11 are added. The resulting solution is mixed until uniform.

Separately, Part B is prepared by placing the deionized water at room temperature (60°–70° F.) in a stainless steel container equipped with a stirrer and, under slow mixing, adding the sodium bicarbonate. The solution is mixed until it is clear.

Part A and Part B are then emulsified by adding Part B, in increments, to Part A. For a 1,000 gram batch, Part B should be added in four increments. With the addition of each increment, there is viscosity build up and the mixer speed should be adjusted accordingly. The batch should look smooth and uniform before adding the next increment.

Part C is prepared separately by adding the butyl cellosolve to the Tektamer 38 under agitation and heating the mixture to 100°–105° F. The heated solution is mixed until a clear solution is obtained. This solution is added to the batch of Part A and Part B while mixing. The resultant product is a water-in-oil emulsion wherein oil is the continuous phase and water is the disperse phase. The product has a cold cream type consistency.

The polishing composition of example A is used as follows. A motor vehicle is first washed to remove major road soils and then dried. The polish of the present invention is applied with a soft cloth onto the painted surface of the motor vehicle and allowed to dry to a residue. The residue of the polishing composition of the present invention is then washed or hosed off with water and towel dried, thereby leaving the gloss agent as a coating on the vehicle surface.

All of the silicone materials used in Example A function as gloss agents and add to the durability of the gloss on the polished surface. Specifically, the gloss agents include silicone oils such as dimethyl silicone and a dimethicone/trimethyl siloxysilicate blend, an amino functional silicone, and a curable silicone resin. The curable silicone resin used in the composition of Example A is sold under the trademark SR-107 by General Electric Company and is available at 60 weight percent in a solvent mixture of Aromatic 150 and aliphatic hydrocarbons. The amino functional silicone used in the composition of Example A is sold under the trademark SF-1706 by General Electric Company and is a 25/75 mixture of methoxy terminated aminoethylaminopropyl polysiloxane and methoxy terminated siloxane resin. If too much gloss agent is used, the preparation may be hard to get off of the polished surface and may have a tendency to smear. The use of too much gloss agent may also add to the cost of the formulation. Further, if too little gloss agent is used, it will not be sufficiently effective in providing a high gloss shine.

The hydrocarbon solvents, e.g., mineral spirits, act to both clean the surface and slow the evaporation of the water. If too much solvent is used, the composition will be hard to emulsify. If too little solvent is used, the solvents may not effectively clean or slow down the evaporation of the water. The mineral oil also acts to slow the evaporation of water. The sorbitan mono-oleate is used as an emulsifier. The 1,2-dibromo-2,4-dicyanobutane (Tektamer 38) is a preservative.

EXAMPLE B

Another polishing composition in accordance with the present invention was prepared using the following components.

| Components | Weight % |
|---|---|
| Part A | |
| 1. Mineral Spirit (Flash Point 105° F. TCC) CAS #8052-41-3 | 3.00 |
| 2. Mineral Spirit (Flash Point 205° F. TCC) CAS #6474-47-8 | 5.45 |
| 3. Ethoxylated nonylphenol (Igepal CO-430, GAF Corp.), HLB: 4.6 | 0.50 |
| 4. Ethoxylated nonylphenol (Igepal CO-850, GAF Corp.), HLB: 16 | 0.50 |
| 5. Dimethyl Silicone, 350 centistoke | 0.50 |
| 6. Dimethyl Silicone, 1,000 centistoke | 0.50 |
| 7. Dimethyl Silicone, 10,000 centistoke | 0.50 |
| 8. Dimethyl Silicone, 60,000 centistoke | 0.20 |
| 9. Mineral Seal Oil (Kermac 600, Kerr-McGee Refining Corp.) | 0.50 |
| 10. Amino Functional Silicone (GE-1706) | 0.50 |
| 11. Dimethicone/Trimethyl Siloxysilicate (Dow Corning 593) | 0.25 |
| 12. Silicone Resin (GE SR-107) | 0.10 |
| Part B | |
| 13. Deionized Water | 74.43 |
| 14. Sodium Bicarbonate | 10.00 |
| Part C | |
| 15. Acrylic Polymer (Alcogum SL-70, 30% Aqueous Emulsion, Alco Chemical Co.) | 3.00 |
| Part D | |
| 16. 1-(3-chloroallyl)-3,5,7-triaza-1-azonia-adamantane chloride (Dowicil 75 Antimicrobial Agent) or 1,2-benzisothiazolin-3-one (Proxel GXL, ICI Americas) | 0.07 |
| | 100.00 |

The polishing composition of Example B is prepared as follows. First, Part A is prepared by placing the two mineral spirits at room temperature (60°–70° F.) in a stainless steel container equipped with an adjustable mixer. Under slow agitation, the remaining components 3 to 12 are added. The resulting solution is mixed until uniform.

Separately, Part B is prepared by placing the deionized water at 115°–120° F. in a stainless steel container equipped with a stirrer and, under slow mixing, adding the sodium bicarbonate. The solution is mixed until it is clear.

Part A and Part B are then emulsified by adding Part B, under moderate agitation, to Part A. Part C and Part D are then added under agitation. The batch is then homogenized at 1.000–1.500 PSIG. The resultant product is an oil-in-water emulsion wherein water is the continuous phase and oil is the disperse phase. The product is a liquid having a viscosity of 20–40 poise.

In Example B, a combination of two nonionic surfactants is used as the emulsifying agent. Specifically, an ethoxylated nonylphenol having an HLB of 4.6, commonly called Igepal CO-430, and an ethoxylated nonylphenol having an HLB of 16.0, commonly called Igepal CO-850 were used as emulsifying agents. These emulsifying agents produced an oil-in-water emulsion. In addition, a thickening agent, Alcogum SL-70, which is an acrylic polymer (ethyl acrylate), was added to the composition. In this example, Dowicil 75 or Proxel GXL were used as preservatives.

The polishing composition of Example B is applied to a motor vehicle surface and rinsed off in the same manner as the polishing composition of Example A, thereby leaving the gloss agent as a coating on the vehicle surface.

EXAMPLE C

Another polishing composition was prepared as follows:

| Components | Weight % |
|---|---|
| Part A | |
| 1. Deionized Water | 7.88 |
| 2. Morpholine | 0.30 |
| 3. Dimethyl Silicone, 350 centistoke | 0.50 |
| 4. Dimethyl Silicone, 1,000 centistoke | 0.50 |
| 5. Dimethyl Silicone, 10,000 centistoke | 0.50 |
| 6. Dimethyl Silicone, 60,000 centistoke | 0.20 |
| 7. Mineral Seal Oil (Kermac 600, Kerr-McGee Refining Corp.) | 0.50 |
| 8. Amino Functional Silicone (GE-1706) | 0.50 |
| 9. Dimethicone/Trimethyl Siloxysilicate (Dow Corning 593) | 0.25 |
| 10. Silicone Resin (GE SR-107) | 0.50 |
| 11. Oleic Acid | 0.30 |
| Part B | |
| 12. Deionized Water | 60.00 |
| 13. Sodium Bicarbonate | 10.00 |
| Part C | |
| 14. Ammonium Hydroxide | 0.50 |
| Part D | |
| 15. Deionized Water | 14.50 |
| 16. Acrylic Polymer (Carbopol EZ-1 Resin, B.F. Goodrich Co.) | 2.00 |
| Part E | |
| 17. Acrylic Polymer (Alcogum SL-70, 30% Aqueous Emulsion, Alco Chemical Co.) | 1.00 |
| Part F | |
| 18. 1-(3-chloroallyl)-3,5,7-triaza-1-azonia-adamantane chloride (Dowicil 75 Antimicrobial Agent) or 1,2-benzisothiazolin-3-one (Proxel GXL, ICI Americas) | 0.07 |
| | 100.00 |

The polishing composition of Example C is prepared as follows. First, Part A is prepared by placing deionized water at room temperature (60°–70° F.) in a stainless steel container equipped with an adjustable mixer. Under slow agitation, the remaining components 2 to 11 are added. The resulting solution is mixed until uniform.

Separately, Part B is prepared by placing the deionized water at 140°–150° F. in a stainless steel container equipped with a stirrer and, under slow mixing, adding the sodium bicarbonate. The solution is mixed until it is clear.

Part A and Part B are then emulsified by adding Part B to Part A. Part A and B are mixed for 45 minutes to one hour. Part C is then added to Part A and B while mixing.

Part D is prepared separately by adding the Carbopol EZ-1 Resin to the deionized water under mixing. This slurry is then added to the batch of Parts A, B and C while mixing. Part E is then added to the batch of Parts A, B, C and D while mixing. The batch of Parts A to E are mixed for 1 hour. Part F is then added to the batch of Parts A to E.

The batch is homogenized at 1.000–1.500 PSIG. The resultant product is a solvent free emulsion as hydrocarbon solvents were not added to the polishing composition as in Examples A and B. The product has a viscosity of 60–70 poise.

In Example C, an anionic surfactant, morpholine oleate, was used as the emulsifying agent. In addition, another thickening agent, Carbopol EZ-1 Resin, an acrylic polymer containing residual acrylic acid, was added to the composition.

The polishing composition of Example C is applied to a motor vehicle surface and rinsed off in the same manner as the polishing composition Example A, thereby leaving the gloss agent as a coating on the vehicle surface.

It can be seen from Examples A, B and C that a polishing composition including a water soluble polishing agent can be prepared as a water-in-oil emulsion, an oil-in-water emulsion, and a solvent free emulsion.

When the polishing compositions of Examples A, B and C were applied to a painted surface and rinsed off, a good initial gloss was noted. In addition, no unsightly residue remained on the surface after the polishing composition was rinsed off of the surface.

Comparative Test Results

Car polish protective coatings are typically destroyed by attrition due to weathering or by the effects of detergents that may be applied when washing the car. The durability of a car protective coating can be measured scientifically by the "contact angle" of water beads on the car finish. High, round water beads indicate the presence of a protective coating. As the protective coating wears away, the water beads tend to flatten out and the contact angle gets smaller, i.e., the higher the contact angle, the greater the beading (protection). Liquid-solid contact angles may vary between 0 and 180 degrees.

Contact angle measurements were used to evaluate the products of Examples A and B against the multi-component polish composition of U.S. Pat. No. 5,330,787 in order to determine the durability of the protective coating obtained when using polishing compositions of the present invention. First, the multi-component polish composition of U.S. Pat. No. 5,330,787, which is commonly sold under the trademark "PRISM", was applied to a precleaned black car hood according to the label directions and evaluated for detergent resistance and contact angle. This multi-component rinse away polish left a protective coating which produced water beads having an average contact angle of 76 degrees. After 5 washings with a detergent solution containing 1 ounce of a detergent car wash solution sold under the trademark ZIPWAX per 1 gallon of cold tap water, the water beads had an average contact angle of 60 degrees.

Second, the water-in-oil composition of Example A of the present invention was applied to a precleaned car hood according to the method described in Example A above. The polish of Example A left a protective coating which produced water beads having an average contact angle of 92 degrees. After 13 washings with a detergent solution containing 1 ounce of a detergent car wash solution sold under the trademark ZIPWAX per 1 gallon of cold tap water, the water beads had an average contact angle of 90 degrees.

Third, the oil-in-water composition of Example B of the present invention was applied to a precleaned car hood according to the method described in Example B above. The polish of Example B left a protective coating which produced water beads having an average contact angle of 86 degrees. After 13 washings with a detergent solution containing 1 ounce of Turtle Wax® Zip Wax® Car Wash per 1 gallon of cold tap water, the water beads had an average contact angle of 82 degrees.

It can be seen from the comparative testing of the polish compositions of Examples A and B of the present invention and U.S. Pat. No. 5,330,787 that both the oil-in-water and water-in-oil emulsions of the present invention produced a protective coating having a durability (as measured by water-hood contact angles) well above another comparable commercial car polish. Therefore, it can be concluded that the polishes of the present invention provide increased durability over other comparable commercial car polishes while at the same time providing the convenience of a one step polishing process.

Although the present invention has been described in detail with reference to certain preferred embodiments that can be advantageously employed in polishing vehicle surfaces, one skilled in the art will appreciate that the present invention can be practiced by other than the preferred embodiments, which have been presented for purposes of illustration and not of limitation. For example, the polishing agent of the polishing compositions of the present invention would be suitable for use in rubbing compounds, polishing compounds and metal polishes. Therefore, the spirit and scope of the appended claims should not be limited to the description of the preferred embodiments contained herein.

What is claimed is:

1. A polishing composition comprising:

a gloss agent including at least one amino functional silicone, at least one silicone oil and at least one curable silicone resin;

a water soluble polishing agent;

a surfactant selected from the group consisting of nonionic and anionic surfactants;

a solvent; and water.

2. The polishing composition of claim 1 wherein the water soluble polishing agent is an inorganic material selected from the group consisting of ammonium benzoate, ammonium bicarbonate, ammonium bromide, ammonium phosphate, potassium carbonate, potassium citrate, potassium phosphate, potassium sulfate, sodium bicarbonate, sodium carbonate, sodium citrate, sodium phosphate, sodium sulfate, and mixtures thereof.

3. The polishing composition of claim 2 wherein the surfactant is selected from the group consisting of morpholine oleate soap, oleic acid triethanolamine soap, an oleic acid/morpholine mixture, an oleic acid/triethanolamine mixture, a stearic acid/morpholine mixture, a stearic acid/triethanolamine mixture, sodium oleate, sodium alkyl benzene sulfonate, polyoxyethylene alkylphenol ether, polyoxyethylene alkyl ether, polyoxyethylene fatty acid esters, ethylene oxide adducts of nonyl phenol, sorbitan monooleate, and mixtures thereof.

4. The polishing composition of claim 3 wherein the solvent is a hydrocarbon solvent selected from the group consisting of mineral spirits, naphtha, kerosene, and mixtures thereof.

5. The polishing composition of claim 4 further including mineral oil.

6. The polishing composition of claim 5 further including a preservative.

7. The polishing composition of claim 6 comprising the following components in weight percent:

| | |
|---|---|
| hydrocarbon solvent | 5.0 to 15.0 |
| silicone oils | 0.5 to 6.0 |
| mineral oil | 0.1 to 5.0 |
| amino functional silicone | 0.1 to 2.0 |
| silicone resin | 0.01 to 3.5 |
| surfactant | 0.20 to 5.5 |

-continued

| | |
|---|---|
| water | 60.0 to 90.0 |
| water soluble polishing agent | 5.0 to 15.0 |
| preservative | 0.05 to 1.0. |

8. The polishing composition of claim 7 wherein the water soluble polishing agent is sodium bicarbonate.

9. The polishing composition of claim 2 wherein the water soluble polishing agent is added to the polishing composition in an amount such that all of the water soluble polishing agent is dissolved in the water, the water soluble polishing agent acting as an abrasive after precipitating out of the water after the polishing composition is rubbed out onto a surface.

10. The polishing composition of claim 2 wherein the water soluble polishing agent is added to the polishing composition in an amount such that a first portion of the water polishing agent is dissolved in the water and a second portion of the water polishing agent is suspended in the polishing composition.

11. The polishing composition of claim 1 wherein the water soluble polishing agent is added to the polishing composition in an amount such that all of the water soluble polishing agent is dissolved in the water, the water soluble polishing agent acting as an abrasive after precipitating out of the water after the polishing composition is rubbed out onto a surface.

12. The polishing composition of claim 1 wherein the water soluble polishing agent is added to the polishing composition in an amount such that a first portion of the water polishing agent is dissolved in the water and a second portion of the water polishing agent is suspended in the polishing composition.

13. A polishing composition comprising:
   a gloss agent including at least one amino functional silicone, at least one silicone oil and at least one curable silicone resin;
   a water soluble polishing agent;
   a surfactant selected from the group consisting of nonionic and anionic surfactants; and
   water.

14. The polishing composition of claim 13 wherein the water soluble polishing agent is an inorganic material selected from the group consisting of ammonium benzoate, ammonium bicarbonate, ammonium bromide, ammonium phosphate, potassium carbonate, potassium citrate, potassium phosphate, potassium sulfate, sodium bicarbonate, sodium carbonate, sodium citrate, sodium phosphate, sodium sulfate, and mixtures thereof.

15. The polishing composition of claim 14 wherein the surfactant is selected from the group consisting of morpholine oleate soap, oleic acid triethanolamine soap, an oleic acid/morpholine mixture, an oleic acid/triethanolamine mixture, a stearic acid/morpholine mixture, a stearic acid/triethanolamine mixture, sodium oleate, sodium alkyl benzene sulfonate, polyoxyethylene alkylphenol ether, polyoxyethylene alkyl ether, polyoxyethylene fatty acid esters, ethylene oxide adducts of nonyl phenol, sorbitan monooleate, and mixtures thereof.

16. The polishing composition of claim 15 further including mineral oil.

17. The polishing composition of claim 16 further including a preservative.

18. The polishing composition of claim 17 comprising the following components in weight percent:

| | |
|---|---|
| silicone oils | 0.5 to 6.0 |
| mineral oil | 0.1 to 5.0 |
| amino functional silicone | 0.1 to 2.0 |
| silicone resin | 0.01 to 3.5 |
| surfactant | 0.20 to 5.5 |
| water | 60.0 to 90.0 |
| water soluble polishing agent | 5.0 to 15.0 |
| preservative | 0.05 to 1.0. |

19. The polishing composition of claim 18 wherein the water soluble polishing agent is sodium bicarbonate.

20. The polishing composition of claim 14 wherein the water soluble polishing agent is added to the polishing composition in an amount such that all of the water soluble polishing agent is dissolved in the water, the water soluble polishing agent acting as an abrasive after precipitating out of the water after the polishing composition is rubbed out onto a surface.

21. The polishing composition of claim 14 wherein the water soluble polishing agent is added to the polishing composition in an amount such that a first portion of the water polishing agent is dissolved in the water and a second portion of the water polishing agent is suspended in the polishing composition.

22. The polishing composition of claim 13 wherein the water soluble polishing agent is added to the polishing composition in an amount such that all of the water soluble polishing agent is dissolved in the water, the water soluble polishing agent acting as an abrasive after precipitating out of the water after the polishing composition is rubbed out onto a surface.

23. The polishing composition of claim 13 wherein the water soluble polishing agent is added to the polishing composition in an amount such that a first portion of the water polishing agent is dissolved in the water and a second portion of the water polishing agent is suspended in the polishing composition.

24. A polishing composition for a painted surface of a vehicle, the polishing composition comprising:
   water;
   a gloss agent including at least one amino functional silicone, at least one silicone oil and at least one curable silicone resin;
   a water soluble polishing agent; and
   a surfactant selected from the group consisting of nonionic and anionic surfactants,
   wherein the polishing composition forms a residue including the water soluble polishing agent when the polishing composition is applied to the vehicle surface and allowed to dry, the residue capable of being substantially removed from the surface of the vehicle by rinsing with water thereby leaving the gloss agent as a coating on the vehicle surface.

25. The polishing composition of claim 24 wherein the water soluble polishing agent is an inorganic material selected from the group consisting of ammonium benzoate, ammonium bicarbonate, ammonium bromide, ammonium phosphate, potassium carbonate, potassium citrate, potassium phosphate, potassium sulfate, sodium bicarbonate, sodium carbonate, sodium citrate, sodium phosphate, sodium sulfate, and mixtures thereof.

26. The polishing composition of claim 25 wherein the surfactant is selected from the group consisting of morpholine oleate soap, oleic acid triethanolamine soap, an oleic acid/morpholine mixture, an oleic acid/triethanolamine mixture, a stearic acid/morpholine mixture, a stearic acid/triethanolamine mixture, sodium oleate, sodium alkyl benzene sulfonate, polyoxyethylene alkylphenol ether, polyoxyethylene alkyl ether, polyoxyethylene fatty acid esters, ethylene oxide adducts of nonyl phenol, sorbitan monooleate, and mixtures thereof.

27. The polishing composition of claim 26 further including mineral oil.

28. The polishing composition of claim 27 further including a preservative.

29. The polishing composition of claim 28 comprising the following components in weight percent:

| | |
|---|---|
| silicone oils | 0.5 to 6.0 |
| mineral oil | 0.1 to 5.0 |
| amino functional silicone | 0.1 to 2.0 |
| silicone resin | 0.01 to 3.5 |
| surfactant | 0.20 to 5.5 |
| water | 60.0 to 90.0 |
| water soluble polishing agent | 5.0 to 15.0 |
| preservative | 0.05 to 1.0. |

30. The polishing composition of claim 29 further including a solvent.

31. The polishing composition of claim 3 wherein the solvent is a hydrocarbon solvent selected from the group consisting of mineral spirits, naphtha, kerosene, and mixtures thereof.

32. The polishing composition of claim 31 wherein the solvent is present in the polishing composition in amount of 5.0 to 15.0 weight percent.

33. The polishing composition of claim 32 wherein the water soluble polishing agent is sodium bicarbonate.

34. The polishing composition of claim 25 wherein the water soluble polishing agent is added to the polishing composition in an amount such that all of the water soluble polishing agent is dissolved in the water, the water soluble polishing agent acting as an abrasive after precipitating out of the water after the polishing composition is rubbed out onto the painted surface of the vehicle.

35. The polishing composition of claim 25 wherein the water soluble polishing agent is added to the polishing composition in an amount such that a first portion of the water polishing agent is dissolved in the water and a second portion of the water polishing agent is suspended in the polishing composition.

36. The polishing composition of claim 24 wherein the water soluble polishing agent is added to the polishing composition in an amount such that all of the water soluble polishing agent is dissolved in the water, the water soluble polishing agent acting as an abrasive after precipitating out of the water after the polishing composition is rubbed out onto the painted surface of the vehicle.

37. The polishing composition of claim 24 wherein the water soluble polishing agent is added to the polishing composition in an amount such that a first portion of the water polishing agent is dissolved in the water and a second portion of the water polishing agent is suspended in the polishing composition.

* * * * *